(12) United States Patent
Sisk

(10) Patent No.: US 9,043,085 B2
(45) Date of Patent: May 26, 2015

(54) VEHICLE ACCESSORY LOAD CONTROLLER AND METHOD

(71) Applicant: Johnson Controls Technology Company, Holland, MI (US)

(72) Inventor: Brian C. Sisk, Mequon, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/014,211

(22) Filed: Aug. 29, 2013

(65) Prior Publication Data

US 2014/0200763 A1 Jul. 17, 2014

Related U.S. Application Data

(60) Provisional application No. 61/751,416, filed on Jan. 11, 2013, provisional application No. 61/800,074, filed on Mar. 15, 2013.

(51) Int. Cl.
| | |
|---|---|
| *G06F 7/00* | (2006.01) |
| *B60W 10/24* | (2006.01) |
| *H02J 7/00* | (2006.01) |

(52) U.S. Cl.
CPC ............... *B60W 10/24* (2013.01); *H02J 7/007* (2013.01)

(58) Field of Classification Search
None
See application file for complete search history.

(56) References Cited

U.S. PATENT DOCUMENTS

| | | | |
|---|---|---|---|
| 5,892,346 A | 4/1999 | Moroto et al. | |
| 5,927,415 A | 7/1999 | Ibaraki et al. | |
| 6,381,522 B1 | 4/2002 | Watanabe et al. | |
| 7,876,071 B2 | 1/2011 | Chen et al. | |
| 8,024,082 B2 | 9/2011 | Richter et al. | |

(Continued)

FOREIGN PATENT DOCUMENTS

| | | |
|---|---|---|
| DE | 102009034180 | 2/2011 |
| DE | 102011017678 | 10/2012 |
| EP | 1256476 B1 | 11/2010 |

OTHER PUBLICATIONS

International Search Report and Written Opinion for International Application No. PCT/US2013077015 mailed Feb. 11, 2015.

(Continued)

*Primary Examiner* — Thomas Tarcza
*Assistant Examiner* — Adam Alharbi
(74) *Attorney, Agent, or Firm* — Fletcher Yoder P.C.

(57) ABSTRACT

A system includes a source of regenerative power that generates power during a regenerative event, an electrical energy storage system connected with the source of regenerative power to receive and store regenerative power during the regenerative event, an accessory load that reduces an amount of energy stored in the energy storage system when being powered, a source of information, and an accessory load controller. The accessory load controller is responsive to the source of information to estimate when a next occurrence of a regeneration event will occur, predict whether the energy storage device will be in a state of charge condition to receive regenerative power at the time of the predicted regeneration event, and control an application of electrical power to the accessory load based on the prediction in order to reduce the amount of energy stored in the energy storage device and minimize any loss of regenerative power during a next regenerative event.

24 Claims, 14 Drawing Sheets

(56) References Cited

U.S. PATENT DOCUMENTS

| | | |
|---|---|---|
| 8,295,950 B1 | 10/2012 | Wordsworth et al. |
| 8,370,012 B2 | 2/2013 | Yamada et al. |
| 8,374,740 B2 | 2/2013 | Druenert et al. |
| 2001/0000212 A1 | 4/2001 | Reipur et al. |
| 2007/0096689 A1 | 5/2007 | Wozniak |
| 2010/0179714 A1* | 7/2010 | Tani et al. .................. 701/22 |
| 2012/0304622 A1 | 12/2012 | Verbrugge et al. |
| 2012/0310565 A1 | 12/2012 | Redey |
| 2014/0097676 A1 | 4/2014 | Hidetoshi |
| 2014/0103866 A1* | 4/2014 | Kothavale et al. ............ 320/108 |

OTHER PUBLICATIONS

Fredrik O. Johansson et al., "Energy Management in a Hybrid Vehicle Using Predicted Road Slope Information, Master of Science Thesis," Chalmers University of Technology, Göteborg, Sweden, retrieved from the internet: URL: http://webfiles.portal.chalmers.se/et/MSc/Johansson&RabieiMSc.pdf, dated 2010, 51 pgs.

Daeheung Lee et al., "Optimal Control Strategy for PHEVs Using Prediction of Future Driving Schedule," Los Angeles, California, USA, retrieved from the internet: URL: http://www.autonomie.netldocs/6-Papers/control_strats/DL-EVS26.pdf, dated May 6, 2012, 9 pgs.

\* cited by examiner

VEHICLE ACCESSORY LOAD CONTROLLER AND METHOD

CROSS-REFERENCE TO RELATED APPLICATIONS

The present application claims priority under 35 U.S.C. §119(e) to U.S. Provisional Patent Application Ser. No. 61/751,416 filed Jan. 11, 2013, and to U.S. Provisional Patent Application Ser. No. 61/800,074 filed Mar. 15, 2013, which are incorporated herein by reference in their entirety.

BACKGROUND

The present disclosure relates generally to the field of batteries and battery modules. More specifically, the present disclosure relates to battery cells that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for supporting propulsion, start stop, and/or regenerative braking functions can be referred to as an xEV, where the term "xEV" is defined herein to include all of the below described electrical vehicles, or any variations or combinations thereof.

A "start-stop vehicle" is defined as a vehicle that can disable the combustion engine when the vehicle is stopped and utilize a battery (energy storage) system to continue powering electrical consumers onboard the vehicle, including the entertainment system, navigation, lights, or other electronics, as well as to restart the engine when propulsion is desired. A lack of brake regeneration or electrical propulsion distinguishes a "start-stop vehicle" from other forms of xEVs.

As will be appreciated by those skilled in the art, hybrid electric vehicles (HEVs) combine an internal combustion engine (ICE) propulsion system and a battery-powered electric propulsion system, such as 48 volt, 130 volt, or 300 volt systems. The term HEV may include any variation of a hybrid electric vehicle, in which features such as brake regeneration, electrical propulsion, and stop-start are included.

A specific type of xEV is a micro-hybrid vehicle ("mHEV" or "micro-HEV"). Micro-HEV vehicles typically operate at low voltage, which is defined to be under 60V. Micro-HEV vehicles typically provide start stop, and distinguish themselves from "start-stop vehicles" through their use of brake regeneration. The brake regeneration power can typically range from 2 kW to 12 kW at peak, although other values can occur as well. A Micro-HEV vehicle can also provide some degree of electrical propulsion to the vehicle. If available, the amount of propulsion will not typically be sufficient to provide full motive force to the vehicle.

Full hybrid systems (FHEVs) and Mild hybrid systems (MHEV or Mild-HEVs) may provide motive and other electrical power to the vehicle using one or more electric motors, using only an ICE, or using both. FHEVs are typically high-voltage (>60V), and are usually between 200V and 400V. Mild-HEVs typically operate between 60V and 200V. Depending on the size of the vehicle, a Mild-HEV can provide between 10-20 kW of brake regeneration or propulsion, while a FHEV provides 15-100 kW. The Mild-HEV system may also apply some level of power assist, during acceleration for example, to supplement the ICE, while the FHEV can often use the electrical motor as the sole source of propulsion for short periods, and in general uses the electrical motor as a more significant source of propulsion than does a Mild-HEV.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of xEV that include all-electric or battery electric vehicles (BEVs), plug-in hybrid electric vehicles (PHEVs), and electric vehicle conversions of hybrid electric vehicles and conventional ICE vehicles. BEVs are driven entirely by electric power and lack an internal combustion engine. PHEVs have an internal combustion engine and a source of electric motive power, with the electric motive power capable of providing all or nearly all of the vehicle's propulsion needs. PHEVs can utilize one or more of a pure electric mode ("EV mode"), a pure internal combustion mode, and a hybrid mode.

xEVs as described above may provide a number of advantages as compared to more traditional gas-powered vehicles using only ICEs and traditional electrical systems, which are typically 12 volt systems powered by a lead acid battery. For example, xEVs may produce fewer undesirable emission products and may exhibit greater fuel efficiency as compared to traditional vehicles and, in some cases, such xEVs may eliminate the use of gasoline entirely, as is the case of certain types of BEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance of such batteries and to reduce the cost associated with the battery systems.

Conventional xEVs have been found to be functionally limited by their electric energy systems that supply power to their electric motor/generator and vehicle accessories. Typically, an electric motor is powered by an energy source that needs to store energy suitable for high-power discharges as well as for electric demands generated by various driving conditions.

Electrical vehicles that can capture energy from braking may produce fewer undesirable emission products and may exhibit greater fuel efficiency as compared to vehicles using ICEs. However, in such vehicles with regenerative power sources the regenerative power is often lost.

Accordingly, it would be desirable for an electrical vehicle equipped in a manner that would enable the capture of all or most of the electrical energy generated by a regenerative power source during a regenerative braking event.

SUMMARY

Disclosed herein are a controlling system and method for controlling an accessory load of an electric vehicle.

In one aspect, a system includes a source of regenerative power that generates power during a regenerative event, an electrical energy storage system connected with the source of regenerative power to receive and store regenerative power during the regenerative event, an accessory load that reduces an amount of energy stored in the energy storage device when being powered, a source of information, and an accessory load controller responsive to the source of information to estimate when a next occurrence of a regeneration event will occur, predict whether the energy storage device will be in a state of charge condition to receive regenerative power at the time of the predicted regeneration event, and control the application of electrical power to the accessory based on the prediction in order to reduce the amount of energy stored in the energy storage device and minimize any loss of regenerative power during a next regenerative event.

In another aspect, a computer-implemented method of reducing loss of regenerative energy in a vehicle by controlling power usage of an accessory includes predicting when next a next regeneration event will occur, estimating when an electrical energy storage system connected with the regenerative power source will be in sufficiently low charge level to receive regenerative energy, and controlling the application of electrical power to the accessory to reduce the loss of regenerative power due to the electrical energy storage system having a greater than optimal amount of energy to accept regenerative energy during the predicted regeneration event.

In yet another aspect, a computing system having a processing unit and a storage device storing instructions that are operable, when executed by the processing unit, to cause the processing unit to perform a method for reducing loss of power from a regenerative source of power that is provided only intermittently during regenerative events to an energy storage device connected with both the source of regenerative power source and an accessory due to the energy storage device having more than an optimal level of charge. The method is achieved by performance of the steps of predicting when a next regenerative event will occur, determining whether the energy storage device will be at an optimal relatively low charge level to be enabled to accept and store all of the regenerative power during the next regenerative event and prematurely applying power to the accessory to reduce the charge level of the energy storage device, if it is determined that the energy storage device will not be at an optimal charge level at the time of the next regenerative event unless power is prematurely applied to the accessory.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE DRAWINGS

The foregoing objects, features and advantages of the present invention will be described in detail and further advantageous features will be made apparent from the following detailed description of the controlled power system and associated power control method of the present invention which is given with reference to the several figures of the drawing, in which.

DETAILED DESCRIPTION

Figure 1:
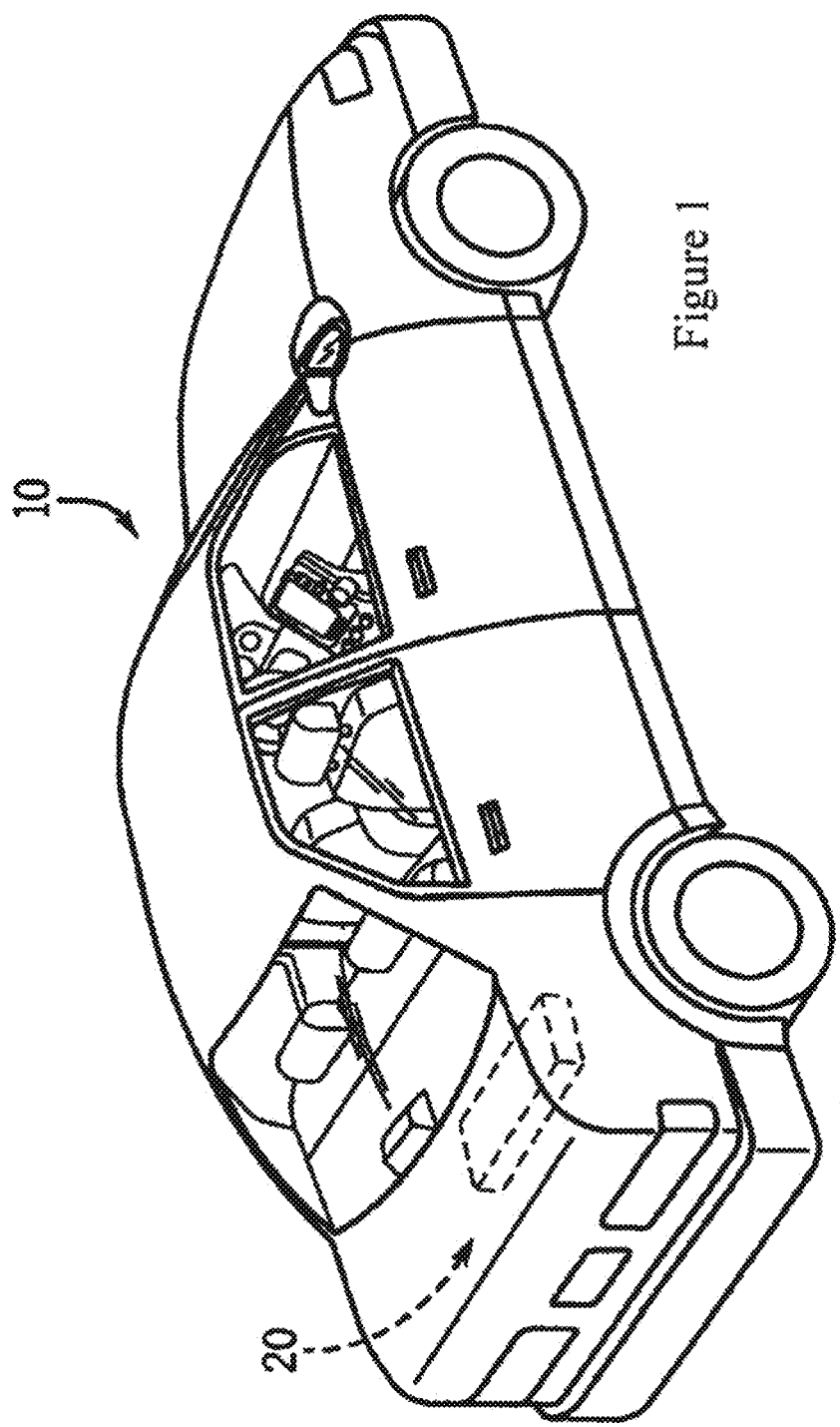
FIG. 1 is a perspective view of a vehicle (an xEV) having a battery system contributing all or a portion of the power for the vehicle, in accordance with an embodiment of the present approach.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, there are several different types of xEVs. Although some vehicle manufacturers, such as Tesla, produce only xEVs and, thus, can design the vehicle from scratch as an xEV, most vehicle manufacturers produce primarily traditional ICEs. Thus, when one of these manufacturers also desires to produce an xEV, it often utilizes one of its traditional vehicle platforms as a starting point. As can be appreciated, when a vehicle has been initially designed to use a traditional electrical system powered by a single lead acid battery and to utilize only an ICE for motive power, converting such a vehicle into its HEV version can pose many packaging problems. For example, a FHEV uses not only these traditional components, but one or more electric motors must be added along with other associated components. As another example, a mHEV also uses not only these traditional components, but a higher voltage battery (e.g., a 48V lithium ion battery module) must be placed in the vehicle to supplement or replace the 12V lead acid battery along with other components such as a belt integrated starter-generator, sometimes referred to as a belt alternator starter (BAS) as described in further detail below. Hence, if a battery system can be designed to reduce such packaging problems, it would make the conversion of a traditional vehicle platform into an xEV less costly and more efficient. As used herein, the BAS is not intended to be limited to a belt-driven alternator starter, as other types of drives could be used.

The battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Presently disclosed embodiments include lithium ion battery modules that are capable of providing more than one voltage. In particular, certain disclosed battery systems may provide a first voltage (e.g., 12V), for example, to power ignition of a combustion engine using a traditional starter motor and/or support conventional 12V accessory loads, and may provide a second voltage (e.g., 48V), for example, to power a BAS and to power one or more vehicle accessories when the combustion engine is not running, for use in a micro-hybrid system for example. Indeed, in certain embodiments, not only may a single battery system provide two voltages (e.g., 12V and 48V), but it can provide them from a package having a form factor equivalent to a traditional lead acid 12V battery, thus making packaging and conversion of a traditional vehicle to a mHEV simpler, less costly and more efficient.

Present embodiments also include physical battery module features, assembly components, manufacturing and assembling techniques, and so forth, that facilitate providing disclosed battery modules and systems that have a desired form factor (e.g., dimensions corresponding to a traditional lead acid battery). Further, as set forth in detail below, the disclosed battery module embodiments include a number of heat transfer devices (e.g., heat sinks, liquid-cooling blocks, heat transfer foams, phase change materials (PCMs), and so forth) that may be used to passively or actively maintain one or more temperatures of the battery module during operation.

With the foregoing in mind, FIG. 1 is a perspective view of an xEV 10 in the form of an automobile (e.g., a car) having a battery system 20 in accordance with present embodiments for providing all or a portion of the power (e.g., electrical power and/or motive power) for the vehicle 10, as described above. Although the xEV 10 may be any of the types of xEVs described above, by specific example, the xEV 10 may be a mHEV, including an ICE equipped with a micro-hybrid system which includes a start-stop system that may utilize the battery system (energy storage system) 20 to power at least one or more accessories (e.g., AC, lights, consoles, etc.), as well as the ignition of the ICE, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
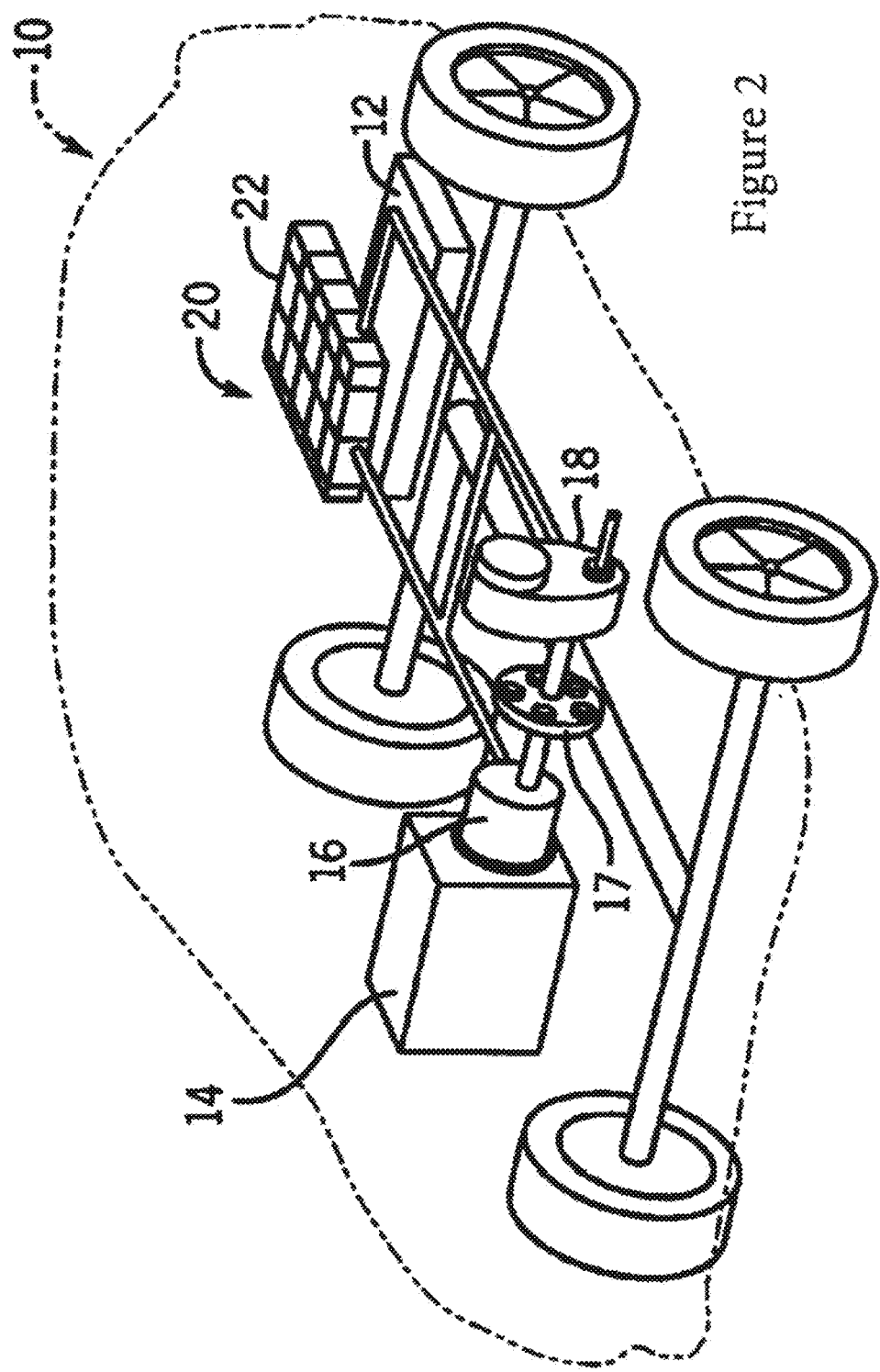
FIG. 2 is a cutaway schematic view of the xEV embodiment of FIG. 1 in the form of a hybrid electric vehicle (HEV), in accordance with an embodiment of the present approach.

FIG. 2 illustrates a cutaway schematic view of an embodiment of the xEV 10 of FIG. 1, provided in the form of an HEV having the battery system 20, which includes one or more battery modules 22. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. Further, as illustrated in FIG. 2, an ICE 14 may be provided for times when the xEV 10 utilizes gasoline power to propel the vehicle 10. The vehicle 10 also includes an electric motor 16, a power split device 17, and a generator 18 as part of the drive system.

The xEV vehicle 10 illustrated in FIG. 2 may be powered or driven by the battery system 20 alone, by the combustion engine 14 alone, or by both the battery system 20 and the engine 14. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 20, the type of vehicle, the type of xEV technology, and the battery chemistry, among other features, may differ from those shown or described.

The battery system 20 may generally include one or more battery modules 22, each having a plurality of battery cells (e.g., lithium ion electrochemical cells), which are discussed in greater detail below. The battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22.

Figure 3:
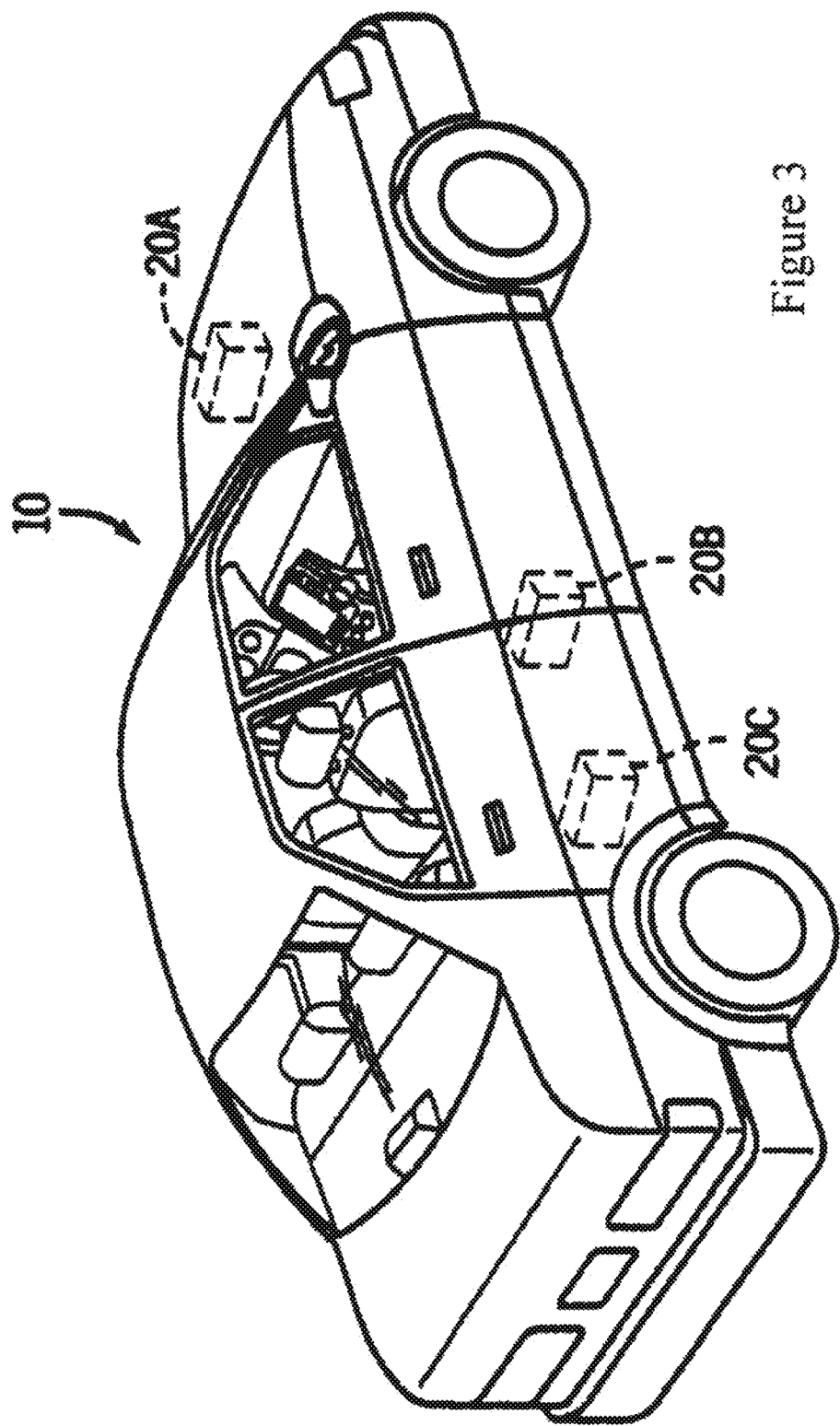
FIG. 3 is a cutaway schematic view of an embodiment of the xEV of FIG. 1 in the form of a micro-hybrid electric vehicle (Micro-HEV), in accordance with an embodiment of the present approach.

FIG. 3 illustrates a cutaway schematic view of another embodiment of the xEV 10 of FIG. 1, provided in the form of a mHEV 10 having the battery system 20. As discussed above, the battery system 20 for use with a micro-hybrid system of an mHEV 10 may include a single battery that provides a first voltage (e.g. 12V) and a second voltage (e.g. 48V) and that is substantially equivalent in size to a traditional 12V lead acid battery used in traditional ICEs. Hence, such a battery system 20 may be placed in a location in the mHEV 10 that would have housed the traditional battery prior to conversion to an mHEV. For example, as illustrated in FIG. 3, the mHEV 10 may include the battery system 20A positioned similarly to a lead-acid battery of a typical combustion-engine vehicle (e.g., under the hood of the vehicle 10). By further example, in certain embodiments, the mHEV 10 may include the battery system 20B positioned near a center of mass of the mHEV 10, such as below the driver or passenger seat. By still further example, in certain embodiments, the mHEV 10 may include the battery system 20C positioned below the rear passenger seat or near the trunk of the vehicle. It should be appreciated that, in certain embodiments, positioning a battery system 20 (e.g., battery system 20B or 20C) in or about the interior of the vehicle may enable the use of air from the interior of the vehicle to cool the battery system 20 (e.g., using a heat sink or a forced-air cooling design, as set forth in detail below).

Figure 4:
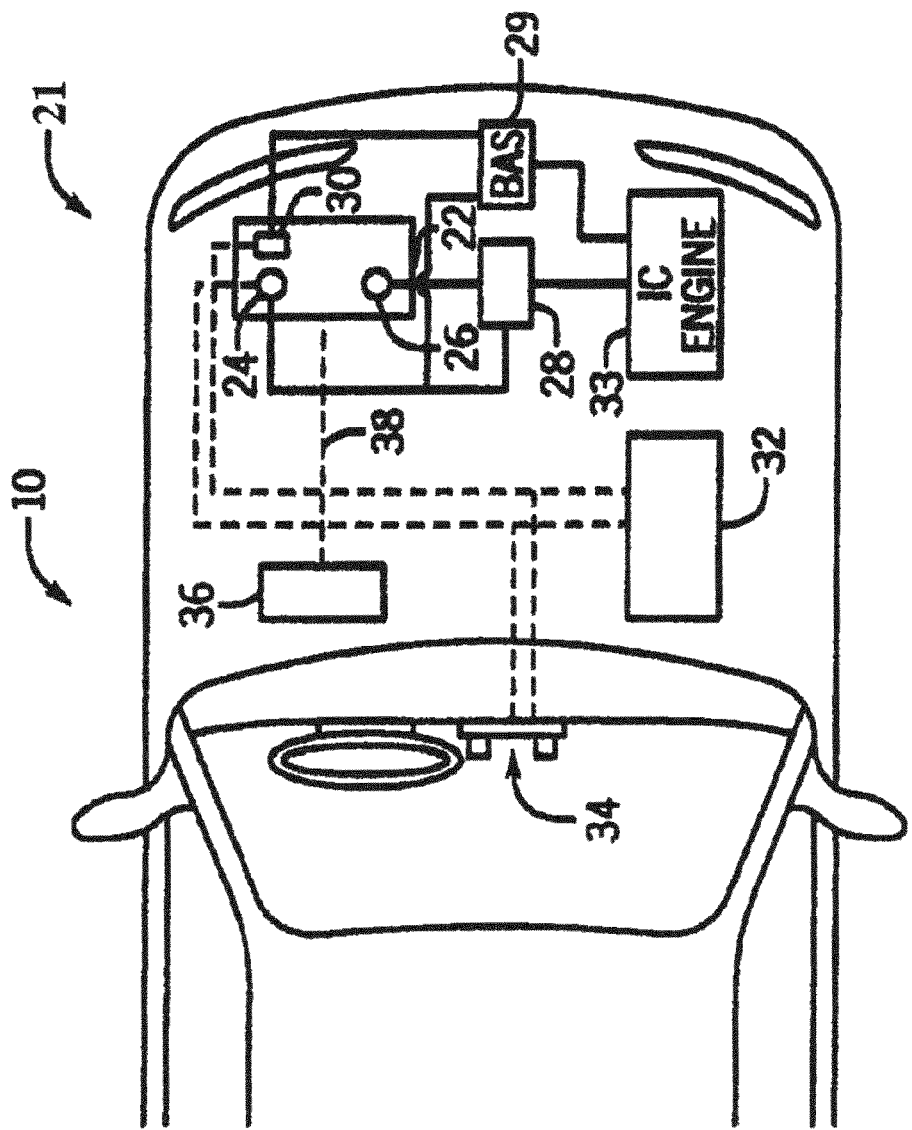
FIG. 4 is a schematic view of the Micro-HEV embodiment of FIG. 3 illustrating power distribution throughout the Micro-HEV, in accordance with an embodiment of the present approach.

FIG. 4 is a schematic view of an embodiment of the mHEV 10 of FIG. 3 having an embodiment of an energy system 21 disposed under the hood of the vehicle 10 and includes battery system 20. As previously noted and as discussed in detail below, the battery system 20 may further have dimensions comparable to those of a typical lead-acid battery to limit or eliminate modifications to the mHEV 10 design to accommodate the battery system 20. Further, the battery system 20 illustrated in FIG. 4 is a three-terminal battery that is capable of providing two different output voltages. For example, a first terminal 24 may provide a ground connection, a second terminal 26 may provide a 12V output, and a third terminal 30 may provide a 48V output. As illustrated, the 48V output of the battery module 22 may be coupled to a BAS 29, which may be used to start the ICE 33 during start-stop cycle, and the 12 V output of the battery module 22 may be coupled to a traditional ignition system (e.g., starter motor 28) to start the ICE 33 during instances when the BAS 29 is not used to do so. It should also be understood that the BAS 29 may also capture energy from a regenerative braking system or the like (not shown) to recharge the battery module 22.

It should be appreciated that the 48 V and 12 V outputs of the battery module 22 may also be provided to other components of the mHEV 10. Examples of components that may utilize the 48 V output in accordance with present embodiments include radiator cooling fans, climate control fans, electric power steering systems, active suspension systems, electric air-conditioning systems, auto park systems, cooled seats, electric oil pumps, electric super/turbochargers, electric water pumps, heated seats, heated windscreen/defrosters, and engine ignitions. Examples of components that may utilize the 12 V output in accordance with present embodiments include window lift motors, vanity lights, tire pressure monitoring systems, sunroof motor controls, power seats, alarm systems, infotainment online features, navigation features, lane departure warning systems, electric parking brakes, and external lights. The examples set forth above are not exhaustive and there may be overlap between the listed examples. Indeed, for example, in some embodiments, features listed above as being associated with a 48 V load may utilize the 12 V output instead and vice versa.

In the illustrated embodiment, the 48 V output of the battery module 22 may be used to power one or more accessories of the mHEV 10. For example, as illustrated in FIG. 4, the 48 V output of the battery module 22 may be coupled to the heating, ventilation, and air conditioning (HVAC) system 32 (e.g., including compressors, heating coils, fans, pumps, and so forth) of the mHEV 10 to enable the driver to control the temperature of the interior of the mHEV 10 during operation of the vehicle. This is particularly important in an mHEV 10 during idle periods when the ICE 33 is stopped and, thus, not providing any electrical power via engine charging. As also illustrated in FIG. 4, the 48 V output of the battery module 22 may be coupled to the vehicle console 34, which may include entertainment systems (e.g., radio, CD/DVD players, viewing screens, etc.), warning lights and indicators, controls for operating the mHEV 10, and so forth. Hence, it should be appreciated that the 48 V output may, in certain situations, provide a more efficient voltage at which to operate the accessories of the mHEV 10 (e.g., compared to 12 V), especially when the ICE 33 is stopped (e.g., during start-stop cycles). It should also be appreciated that, in certain embodiments, the 48 V output of the battery module 22 may also be provided to any other suitable components and/or accessories (e.g., lights, switches, door locks, window motors, windshield wipers, and so forth) of the mHEV 10.

Also, the mHEV 10 illustrated in FIG. 4 includes a vehicle control unit/module (VCM) 36 that may control one or more operational parameters of the various components of the vehicle 10, and the VCM 36 may include at least one memory and at least one processor programmed to perform such tasks. Like other components of the mHEV 10, the battery module 22 may be coupled to the VCM 36 via one or more communication lines 38, such that the VCM 36 may receive input from the battery module 22, and more specifically, the battery control module (BCM) of the battery module 22 (discussed in detail below). For example, the VCM 36 may receive input from the battery module 22 regarding various parameters, such as state of charge and temperature, and the VCM 36 may use these inputs to determine when to charge and/or discharge the battery module 22, when to discontinue charging the battery module 22, when to start and stop the ICE 33 of the mHEV 10, whether to use the BAS 29 or the starter 28, and so forth.

As stated above, hybrid electric vehicles (HEV) utilize electric power as well as mechanical power for propulsion. As such, the performance of an HEV can be directly influenced by the characteristics of the energy storage system (ESS).

In order to maximize energy utilization and fuel economy for an HEV, it is known to provide using a regenerative power source, such as wind, solar, braking power, and any non-fossil fuel generating device, electrical energy to batteries or other energy storage device during regenerative power events. However, the regenerative power is only available during the actual regenerative power event such that, if the energy storage device that is to accept electrical energy from the regenerative power source is near its maximum state of charge (SOC) at the time of the regenerative power event, then it cannot accept any more electrical energy from the regenerative power source and all of the regenerative power is lost. If the SOC of the energy storage device is not at its maximum SOC level but still charged with electrical energy above a particular level, then a portion of the regenerative power will be lost.

In accordance with the present disclosure, to improve system efficiency of an HEV, an ESS that is configured to optimally receive and supply electrical energy is provided. The ESS is configured to handle high power discharging and charging functions triggered by various driving conditions/modes, such as starting, cruising, accelerating, and regenerative braking. One way to improve the performance, cycle life, and power characteristics of an ESS is to combine different types of energy storage devices that include a high power storage device, such as an ultra-capacitor, and a high energy device such as a lead-acid battery. One such ESS can be referred to as a hybrid energy storage system (HESS). Moreover, in accordance with the disclosure, a further improvement of system efficiency of the HEV is achieved by optimizing usage of cyclical and/or non-essential vehicle accessories based on a state of charge (SOC) of the energy storage system to ensure regenerative braking energy is not lost. In one embodiment, if the SOC is too low, i.e., close to a preselected minimum SOC, optional accessories, such as a defroster and air conditioning, will be delayed until the SOC is increased. In another embodiment, if the SOC is too high, i.e., close to a preselected maximum SOC, cyclical accessories will be increased temporarily to lower (drop) the SOC. The temporary increase of cyclical accessories can be performed within tolerances of a respective accessory system, such as climate control for example.

Figure 5:
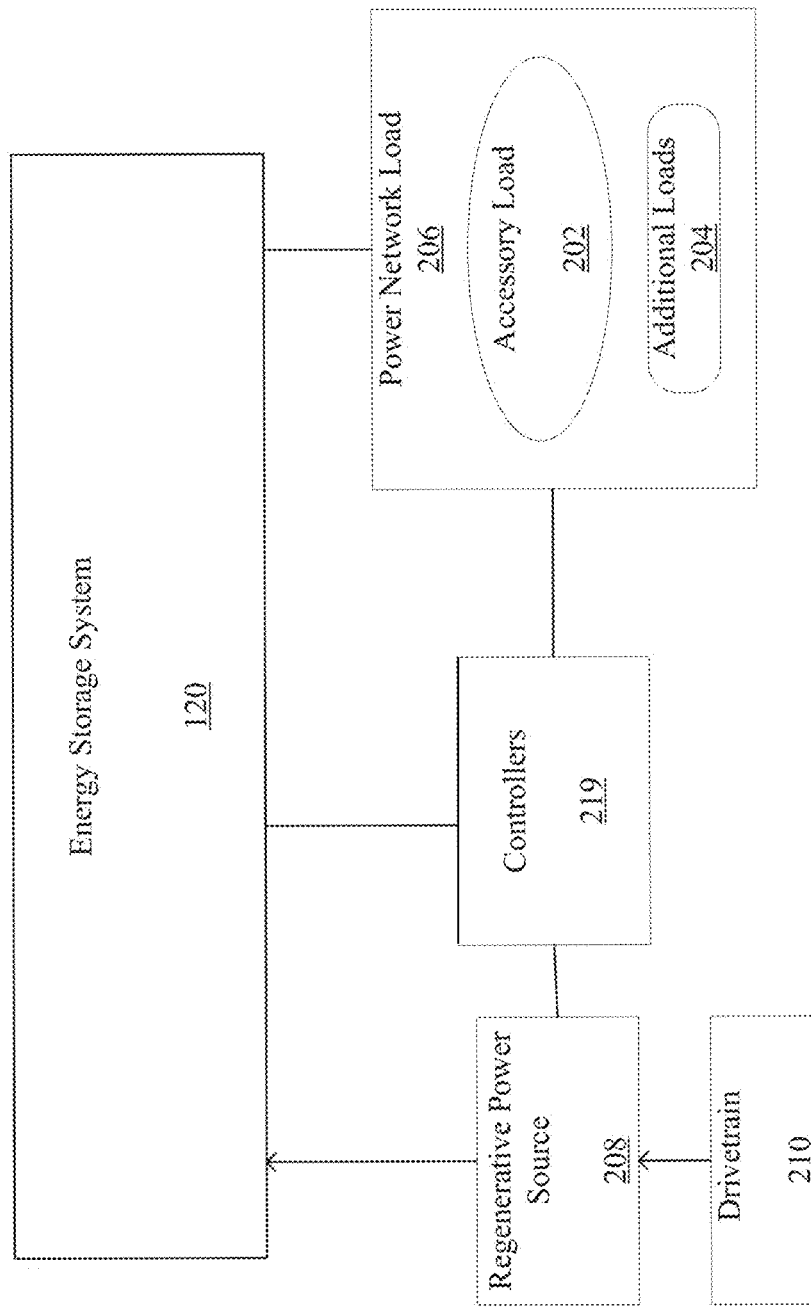
FIG. 5 is a block diagram illustrating an embodiment of the vehicle accessory load controller.

Now referring to FIG. 5, exemplary embodiments of basic elements of an accessory load control system that may be used with vehicle 10 are shown. Vehicle 10 has a number of accessories that define an accessory load 202 and require accessory power to be supplied from ESS 120, which also provides power to other loads 204, such as motive power, braking assist, etc. which together with accessory load 202 defines a power network (powernet) load 206. Powernet load 206 can represent the total of all the electrical consuming loads that depend on energy storage system 120 for power.

An accessory load can be any device that rely on electric power for operation, and may include devices such as an air conditioning system, a GPS unit, display units such as liquid-crystal displays (LCDs), heating units, condenser motors, any heating, ventilation, and air conditioning (HVAC) components and/or controls, any hydraulic device such as power brakes or power steering, entertainment units including a stereo system and speakers, power door locks and power windows, computers, processors, storage devices, sensors, and any other such devices. Accessory power for accessory load 202 is obtained directly from ESS 120, which may include one or more energy storage devices such as batteries, capacitors, ultra capacitors, or other energy storage device of any type capable of providing stored power to accessory load 202. The same energy storage devices or other ones may provide motive power for vehicle 10.

As shown, ESS 120 is also linked through the power network to receive charging power from a regenerative power source 208 coupled with a drivetrain 210. As known to one of ordinary skills in the art, regenerative braking events only occur when vehicle 10 is decelerating such as during braking. If ESS 120 is not in a charge state suitable to receive the regenerative power when a regenerative braking event occurs, the regenerative power will be lost and wasted.

Figure 6:
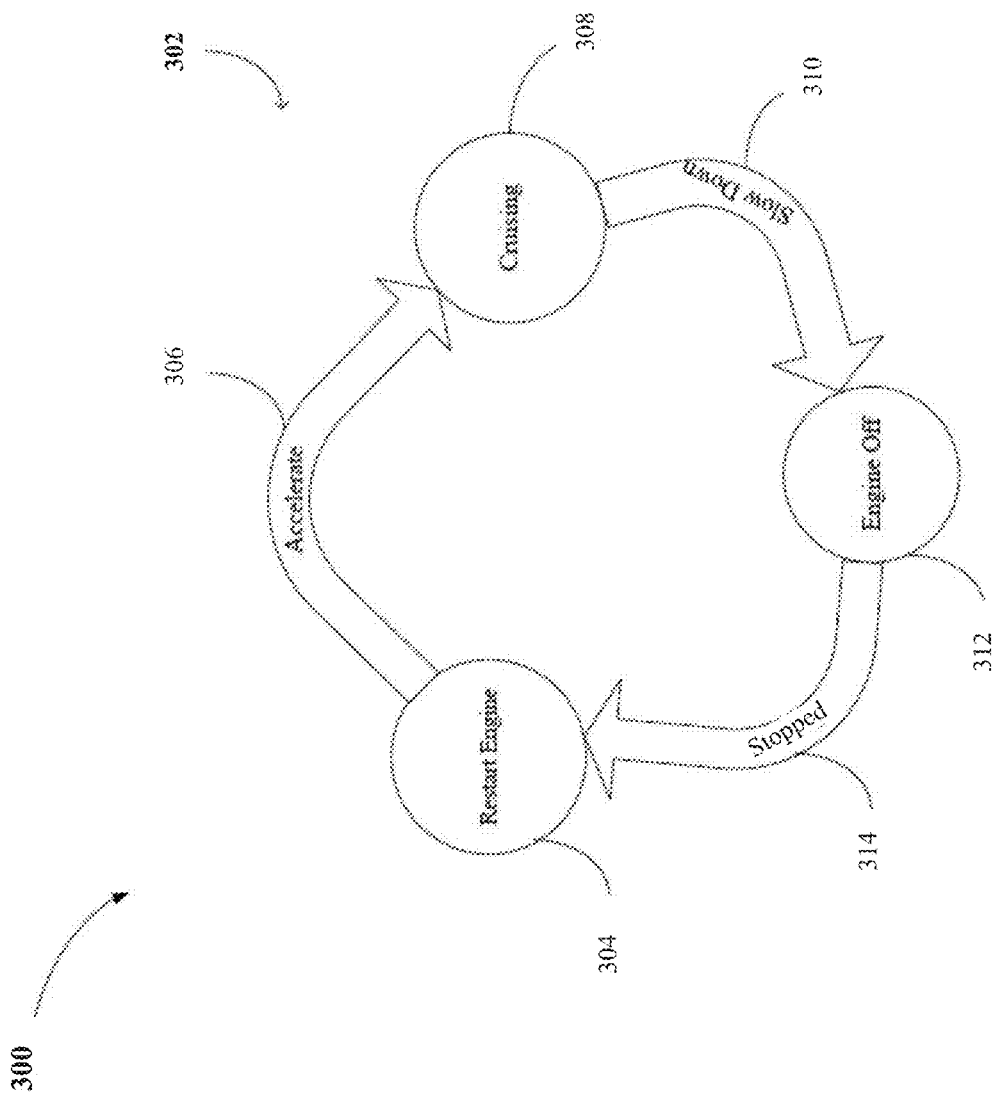
FIG. 6 is a block diagram illustrating an exemplary embodiment of a driving cycle as performed by a hybrid electrical vehicle.

Now referring to FIG. 6, an exemplary embodiment 300 of a driving cycle 302 as performed by a micro or mild hybrid electrical vehicle is shown. Driving cycle 302 includes six operational modes, which are a restart engine mode 304, an acceleration mode 306, a cruising mode 308, a slow-down mode 310, an engine-off mode 312, and a stopped vehicle mode 314. Four of these operational vehicle modes 304-312 provide opportunities for ESS 120 to implement a process to optimize a management of the generated and stored energy. In one embodiment, during slowdown mode 310, ESS 120 is configured to capture braking energy through regeneration of electrical power to raise the state of charges (SOCs) of energy storage devices. During engine-off mode 312, ESS 120 is configured to support vehicle accessories, such as interior and exterior lights, infotainment, fans and blowers, and electronics in order to lower if needed current SOCs to capture regenerative braking energy generated by the next braking event. During acceleration mode 306, ESS 120 is configured to provide boosting power using a belt-driven motor/generator.

Figure 7:
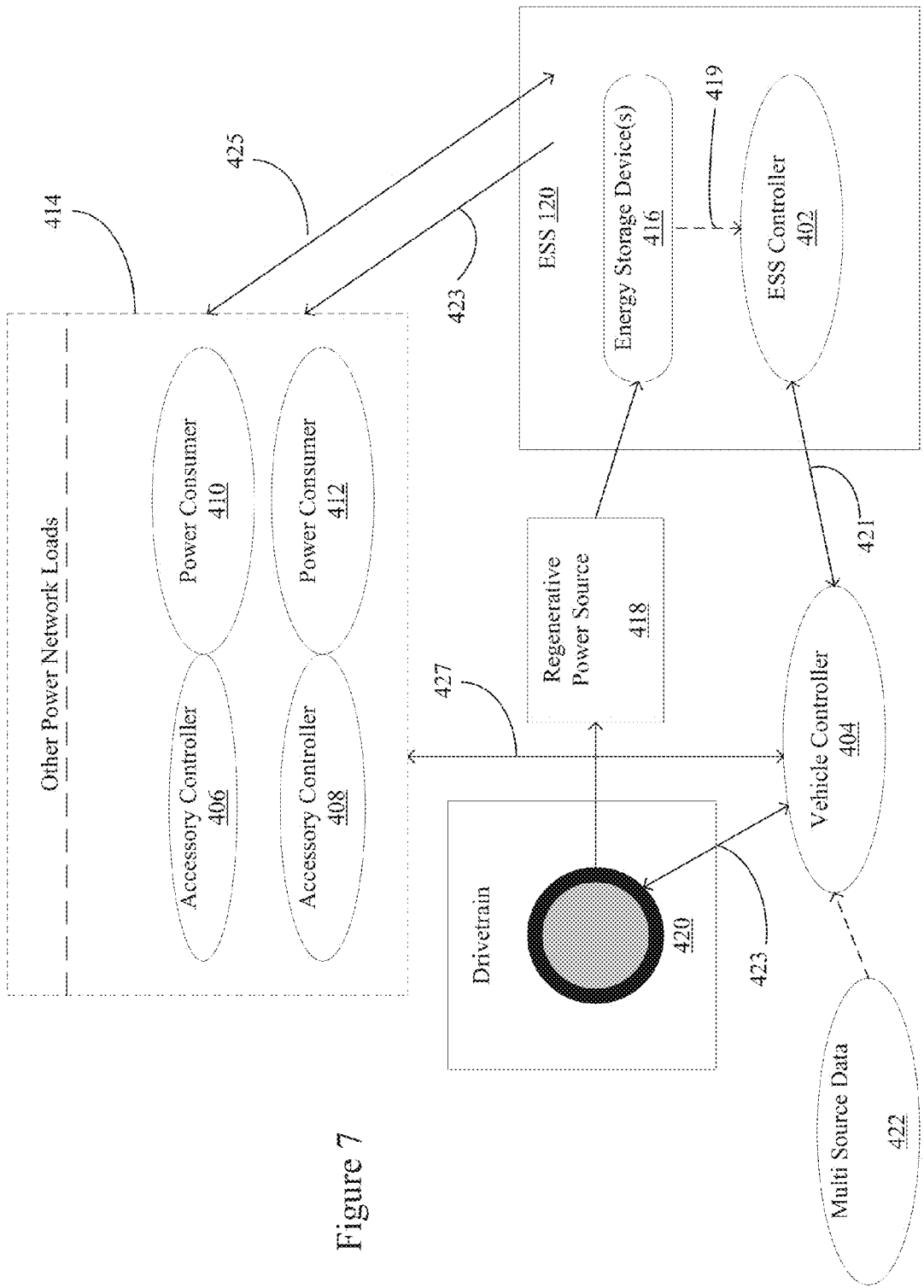
FIG. 7 is a functional block diagram illustrating elements of the vehicle accessory controller.

Now referring to FIG. 7, in one exemplary embodiment, ESS 120 includes an electrical storage system controller 402 that communicates with one or more vehicle controllers 404 to obtain data needed for its operation and also communicates with accessory controllers 406 and 408 that are associated with power consumers 410 and 412 of accessory load 414 to control the operation of accessory controllers 406 and 408 based on data received from vehicle controller 404. Alternatively, only one accessory controller may be used to control a plurality of accessories.

As will be described in detail below, accessory load controllers 406 and 408 and/or ESS controller 402 are configured to predict, based on the information received from vehicle controller 404, when a next regenerative event will occur. If a regenerative event occurs when energy storing devices 416 of ESS 120 are fully charged, then ESS 120 will be unable to receive additional power from a regenerative power source 418 and all the regenerative power will be lost.

Accordingly, if it appears, based on current usage and predicted usage and other factors that energy storage devices 416 will be charged at an SOC level higher than suitable to receive the full benefit of the regenerative event, then, if possible and practical, one or more accessories will be caused to commence operating or to alter their respective operation to reduce the SOC level, preferably to a level that enables receipt of all or most of the power provided from regenerative power source 418 during the next regenerative event. For example, at least one of accessory load controllers 406 and 408 may cause the application of power to a condenser motor or an air conditioner to turn on even though, based on its normal thermostat controlled operation, it would not turn on until a later time after the predicted regenerative event.

Still referring to FIG. 7, ESS controller 402 receives sensor data either through direct measurement or over a communication data link 419 from which a measurable condition of energy storage device or devices 416, such as voltage or temperature, can be determined. ESS controller 402 is configured to receive and send data over a communication link 421 with vehicle controller 404, which also has a one way or two-way communication link 423 with components of a drivetrain 420. In addition, vehicle controller 404 is configured to receive information from a plurality of data sources 422.

As stated above, accessory load 414 includes battery power consumers (i.e., accessories) 410 and 412 that consume power from energy storage devices 416 over an accessory power network 423. Moreover, as accessories 410 and 412 are associated with accessory controller 406 and 408, respectively, ESS controller 402 can obtain information from accessory controllers 406 and 408, and sends to accessory controllers 406 and 408 commands over a one- or two-way communication link 425. Alternatively, ESS controller 402 receives information from accessory controllers 406 and 408, and issues commands to accessory controllers 406 and 408 through a communication link 421 with vehicle controller 404. In turn, vehicle controller 404 is linked to accessory controllers 406 and 408 via a one- or two-way communication link 427.

While energy storage system 120 may have two or more energy storage devices 416, only a single energy storage device may be needed. However, if there are two energy storage devices, then one topology that will work successfully is to have one high power storage device for receiving regenerative power from regenerative power source 418 and one high energy storage device for receiving power from the high power storage device. In one embodiment, energy storage system 120 includes at least two energy storage devices 416. In such case, one of energy storage device 416 can be a high power storage device that is able to accept a relatively large amount of power in a short amount of time, such as a lithium-ion battery, capacitor or ultra-capacitor.

In accordance with the present disclosure, the specification for the high power storage device will depend highly on the application. In general, the "power" storage device will be tailored such that it can take much or all of the current output of an alternator or generator for a typical brake regeneration pulse, somewhere between 10 seconds and 2 minutes, typically. The energy device can be sized based on different constraints, which could include an anticipated key-off load, accessory draw, voltage stabilization, or other application, and specifications will be different for each vehicle. In general, the power storage device will have a higher power density than the energy storage device, but their respective energy density will be the opposite. In general, lead-acid batteries will be energy storage devices, and electric double layer capacitors (EDLC, i.e., "ultra-capacitors") will be power storage devices. In the middle, in order from "energy" to "power" storage devices, ESS 120 can include Li-ion energy cells or NiMH, Lion power cells, pseudo-capacitors, lithium capacitors, and asymmetric capacitors.

There may be many electrical power consuming accessories. Some of them can be controlled automatically by vehicle controller 404 while others can be controlled in whole or in part by the occupants of vehicle 10. In one embodiment, ESS controller 402 receives data from individual storage devices 416, and Vehicle controller 404 receives other data such as route information from a GPS unit or navigation system. Either one of controllers 402 and 404 may be "the controller" that is used in the following discussion, depending upon the selected configuration noted above. However, for purposes of simplifying the following description, a configuration will be assumed in which the ESS controller 403 performs all of the control functions based in part on information obtained from vehicle controller 404. In another embodiment, ESS controller 402 may be configured to make a determination that an accessory load needs to be increased. Then, a respective accessory controller or a master accessory controller (not shown), which may be integrated with vehicle controller 404, determines how the lad increase may be performed.

Figure 9:
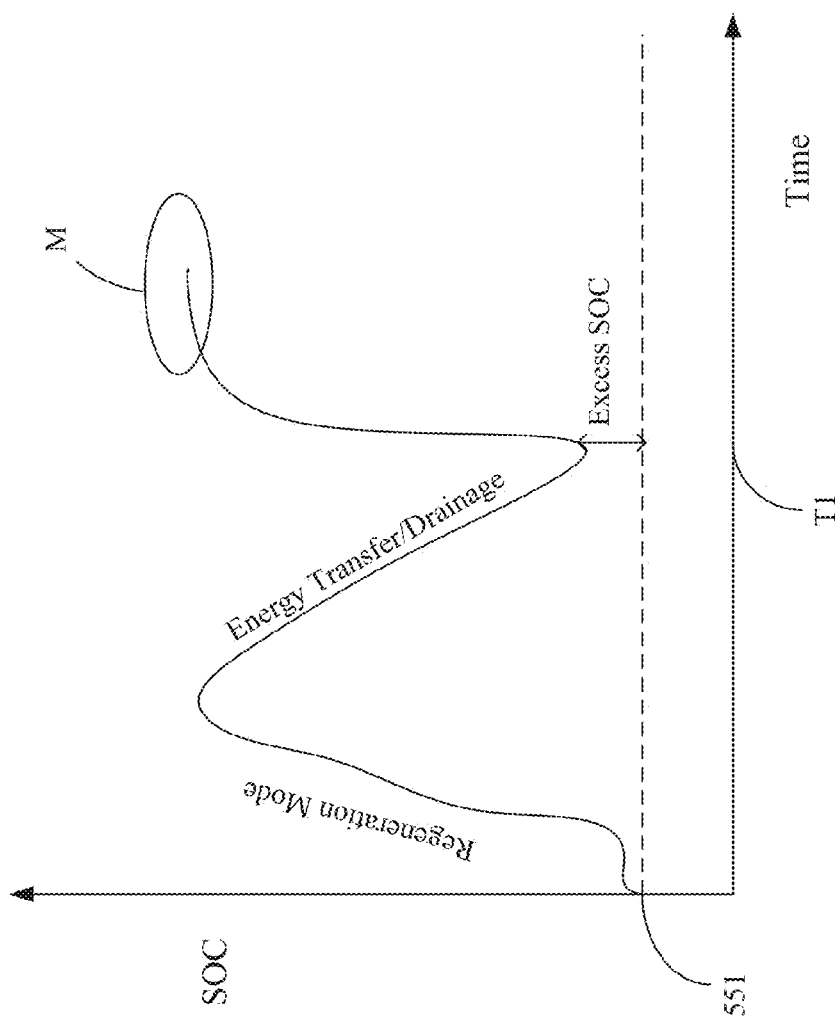
FIG. 9 is an exemplary graph of the charging and discharging of an energy storage device in a conventional PRIOR ART power system and the loss of regenerative power because of excess charge in the energy storage device.

In one embodiment, ESS controller 402 is configured to determine a relative likelihood of reaching an opportunity for brake regeneration while there is a greater amount of energy than an optimal amount that will enable energy storage system 120 to receive and store all or most of the regenerative power during a regenerative event. This optimal amount is illustrated in FIG. 9 as an SOC target level 551 of stored energy. If there is a risk of losing brake regenerative power during the next regenerative event due storage devices 416 being too full of charge, then ESS controller 402 causes periodic or optional power consumers to be controlled to turn on early. ESS controller 402 is further configured to weigh the regenerative power loss risk against any negative affect from disrupting normal or ordinary vehicle operation.

For example, an electric air conditioner might be used early to drop the temperature below the climate control set point to drain energy storage devices 416 before the regenerative event occurs, thereby reducing demand for cooling later. Alternately, an electro-hydraulic system might be pressurized slightly more than usual. These opportunities will be compared by accessory controller 406 or 408.

Figure 8:
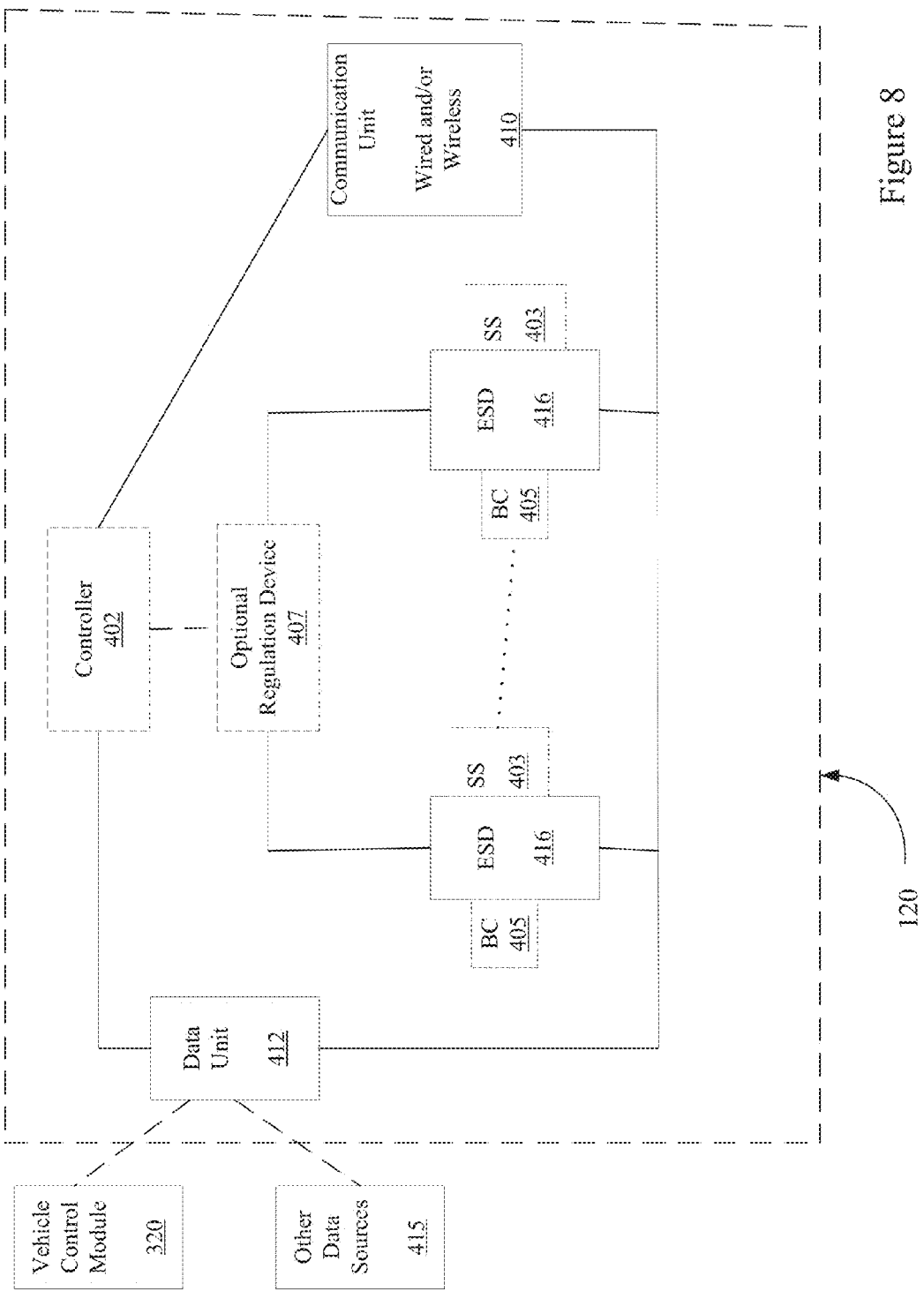
FIG. 8 is a functional block diagram illustrating an exemplary embodiment of an energy storage system.

Now referring to FIG. 8, an exemplary embodiment of ESS 120 that may be used with vehicle 10 is shown. ESS 120 may include two or more energy storage devices (ESDs) 416 such as batteries, capacitors, ultra capacitors, or any other type of energy storage device capable of providing stored power to a vehicle accessory load and to an engine starting unit. ESS 102 further includes a communication unit 410, an optional voltage/current/power regulating (regulation) device 407, a data unit 412, and a controller 402. Moreover, each of energy storage devices 416 may be coupled to a state sensing (SS) unit 403 and to a battery controller (BC) 405.

Sensing and/or other data may be collected by a data unit 412 from the vehicle, from vehicle accessories (not shown), from energy storage devices 416, from drivetrain components (not shown), and/or from other data sources 415, such as environmental data sources. This data can be communicated to one or more of controller 402, and/or vehicle control module 320, and/or with the vehicle itself. This transfer can be performed by communication unit 410, which can be either a wired or wireless unit, and use any communication protocol. The data, from one or more of units 416, 403, 405, other data sources 415, and vehicle control module 320, may be needed by controller 402 and/or regulation device 407 to perform their control and/or regulation functions.

Referring to FIG. 9, an illustration of the loss of regeneration power in conventional energy storage systems shows that this occurs at section M when the energy storage device reaches a maximum charge and cannot accept any more power from the regenerative event. This occurs because at the beginning of the regenerative event, there is excess SOC above an ideal low SOC target level 551. The amount of charge in excess of the SOC target charge 551 at time Ti when another regenerative event occurs is substantially the same amount of regenerative power that is lost. If the SOC at the beginning of a regenerative event is at maximum, then all of the power from the regenerative event is lost.

Figure 10:
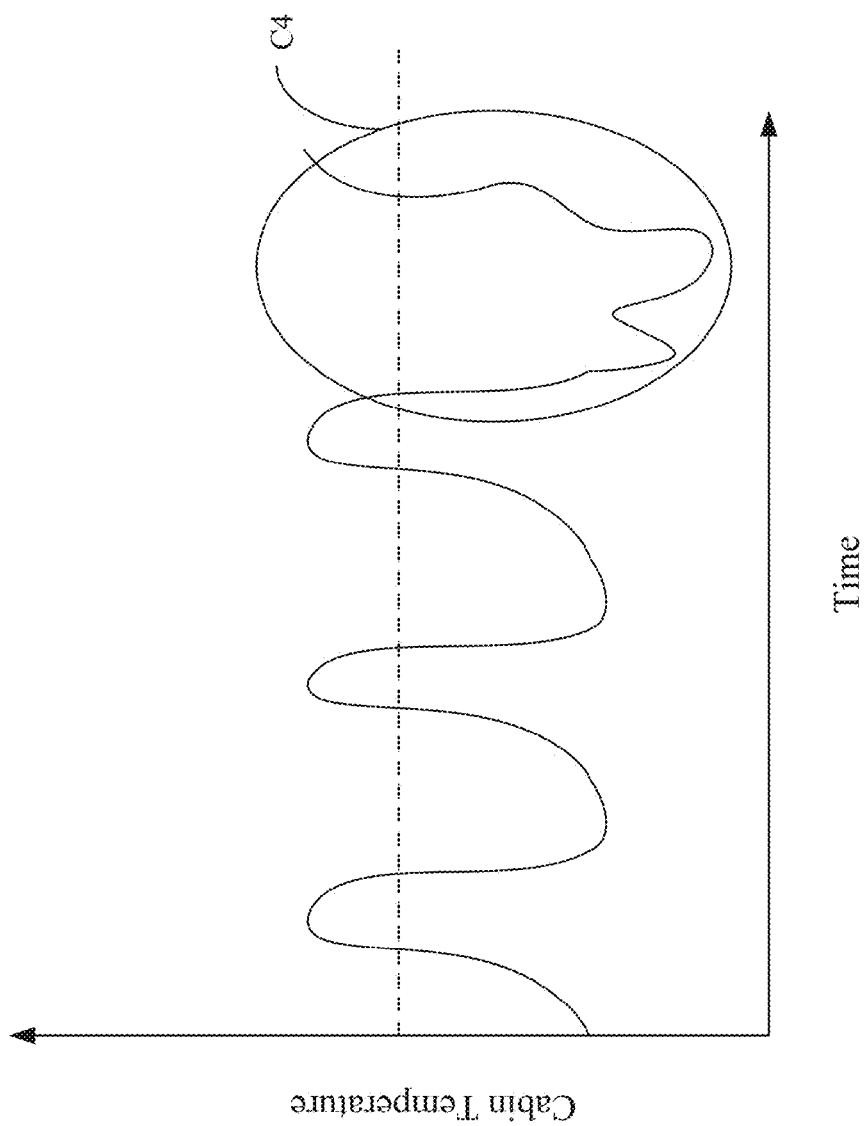
FIG. 10 is an exemplary graph illustrating disruption of an air conditioning accessory by the accessory load control system by causing an early start of operation to enable reduction of the charge of an energy storage device providing accessory power to enable it to receive all of the regenerative power during an anticipated regenerative event.

Referring to FIG. 10, in one embodiment, one of accessory load controllers 406 and 408, can disrupt the normal periodic cycling of the air conditioner by starting a cooling cycle C4 earlier than normal before the regenerative event to bring the charge down to as close as possible to the SOC target to maximize the receipt of charge from the regenerative event.

In accordance with the present disclosure, the amount of accessory load is predicted into the future by the corresponding controller based upon relatively current history of accessory usage over multiple time scales. The relatively current history over a time period from seconds to an hour or so during the current driving trip is utilized as well as the prior history of accessory usage during prior driving trips. Vehicle controller 404 may also receive input information concerning the route that vehicle 10 is taking from a GPS unit or a navigation system. Vehicle controller 404 may also receive input information regarding external temperature, solar intensity, and rate of heat absorption or loss from the cabin. Prior usage history from prior trips with the same routed may also be used for the prediction in addition to the current vehicle state including speed and acceleration that may be obtained from vehicle controller 404 through ESS controller 402.

In order to optimize cost versus benefit, a high power storage device for receiving the regenerative power may be minimized in terms of size and capability and thus may have limited capacity. In such case of limited capacity, it may be necessary to offload captured regeneration energy before the next braking event to avoid losing the opportunity to capture more energy. The need to offload captured energy depends on how quickly the energy can be used by accessory load and the remainder of a powernet load 424, of which it is a part. If the expected load current is too low, energy must be moved. In accordance with the present disclosure, whatever available information is available is used to predictively determine when the next regeneration event will be, how quickly the expected load current will drain at least one of energy storage device 416 receiving regenerative power and the likelihood that the regeneration capability will be impacted negatively through excess remaining energy in that energy storage device 416. If this consideration outweighs the inefficiency of moving energy between the between the storage, then the energy is moved.

Figure 11:
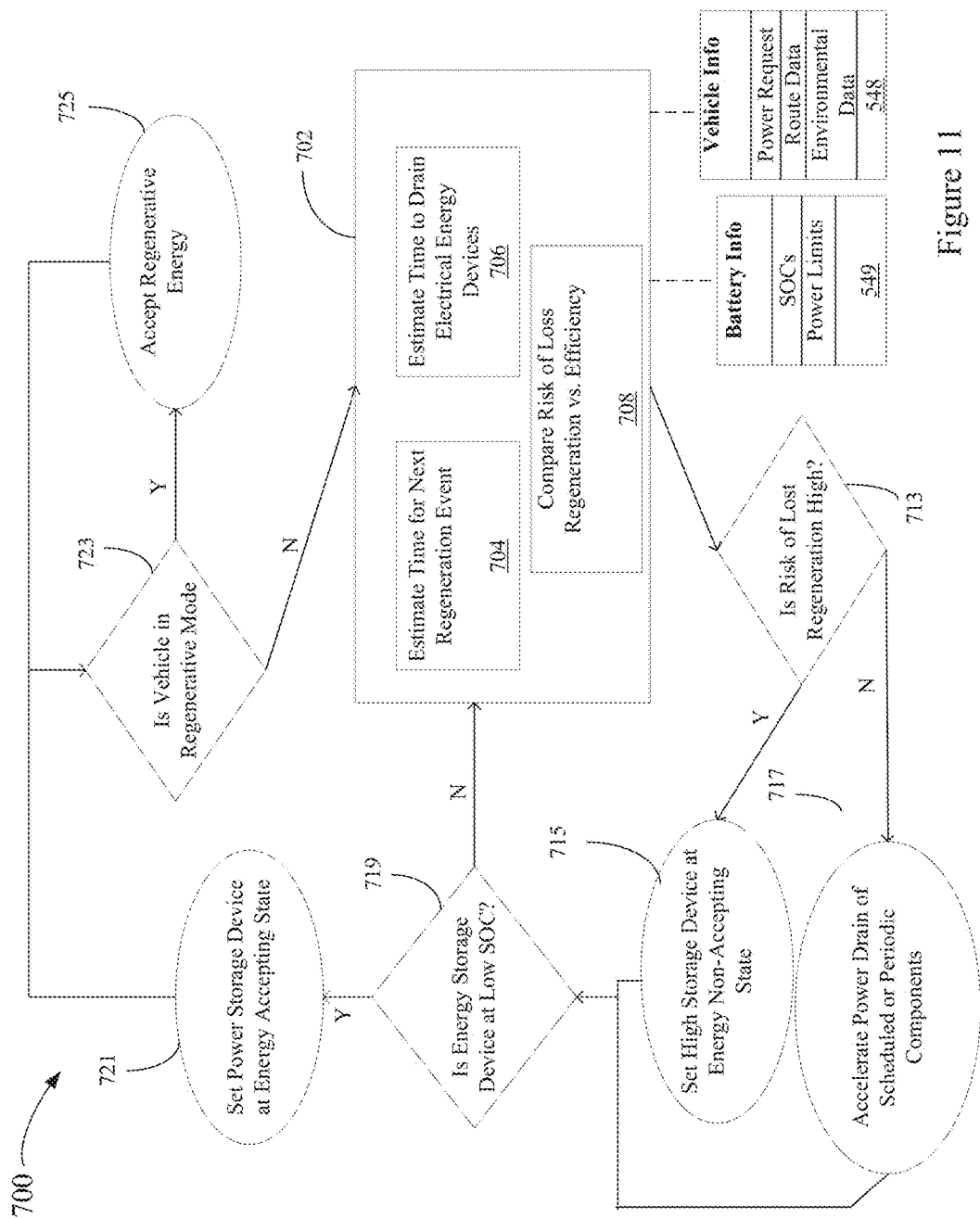
FIG. 11 is a flow chart of an embodiment of the vehicle accessory controller system illustrated in the functional block diagram of FIG. 7.

Now referring to FIG. 11, a flow chart illustrates an operation of the accessory power control system 200 described in greater detail hereafter. In FIG. 11, dotted lines represent data flow, solid lines indicate operation flow and rectangles represent algorithmic operations, ovals represent vehicle functions, and diamonds represent algorithmic decisions. A regeneration event program 702 directed to regenerative events includes three sub-programs (subroutines) 704, 706, and 708. Sub-program 704 is configured to estimate the time to the next regeneration event. Sub-program 706 is configured to estimate the time to drain energy storage devices 416 connected to receive the regenerative power. Sub-program 708 is configured to compare the risk of lost regeneration because of excess charge versus the negative impact that disruption of normal operation of the vehicle accessories or accessory will cause. These estimations and comparison may be based on power request data, route data and other data from vehicle 10, SOC data, power limits data, and other data relating to battery information.

The estimated time to the next regeneration event of sub-program 704 uses any information available to energy storage system 120. The time to the next stop, or regeneration event may be calculated from a given stop frequency using a statistical model, such as an Erlang statistical distribution. The time to the regeneration event may also be estimated in part from the type of driving that is being experienced which, in turn, may be determined from speed and acceleration trend information including minimum speed, average speed, and maximum speed, as well as from heading and turn information. When there are multiple drivers, the identity of the driver may be determined from a unique code associated with a particular driver's electronic key or may be determined from any of the other data described here to predict the route and thus time to the next stop. The estimated time to the next regeneration event of sub-program 704 may also be determined, at least in part, from stored driving data that may be used to infer the route and thus the time of the next stop.

Further, stored battery data may be used to infer when brake regeneration events have occurred based on one or more of charging power, charging voltage, duration of a charging event and a voltage-current-power signal characteristics including a Fourier transform decomposition of these characteristics. Also, the prediction may be based in part on explicit route information that may be received from a vehicle navigation system, user devices or other means. Alternatively, the route may be detected by the vehicle or energy storage system by an internal or external GPS receiver or other means.

Thus, as seen in FIG. 11, vehicle data 710, including power request, route data, climate control data, and other data noted above from vehicle controller 404 or elsewhere, is provided to the regeneration event program 702. In addition, battery information 712 including SOCs, power limits, and other battery data noted above is also provided to regeneration event program 702 to achieve the estimation, as shown.

Sub-program 706 that estimates the time required to drain at least one energy storage devices 416 receiving regenerative power uses present and expected powernet load information, the capacity of energy storage devices 416, the desired SOC target charge 551 at time Ti, and other information to make the estimate. The demand of powernet load 424 can be calculated at any given time based on the present demand. Alternatively, or additionally, the demand of powernet load 424 can be calculated based on a prediction of future demand. The future demand of powernet load 424 is based on past demand of powernet load 424 and external information from vehicle controller 404 and elsewhere.

A total energy capacity of an energy storage device is defined as the total amount of energy that can be stored in the energy storage device given all relevant restrictions and requirements on the use of the components of energy storage devices 416. The total energy capacity of an energy storage device depends on the present SOC, the minimum SOC, the capacity measured in ampere-hours and the operational voltage of the energy storage device. The total energy capacity of an energy storage device is equal to the difference between the maximum SOC and minimum SOC times the capacity in ampere-hours times the operational voltage. The present estimated SOC of the battery or other energy storage device that is defined as the amount of electrical charge stored in the storage device divided by the total capacity of the energy storage device. The minimum SOC is determined based on many factors including the need to prevent damage to the energy storage device in question, the need to maintain a reserve of energy and the need to keep the resistance below a certain threshold. The total energy capacity of the energy storage device, measured in ampere-hours defines the total electrical capacity of the energy storage device. The operational voltage will vary depending on factors including the utilization of the energy storage device due to the IR voltage drop on discharge, which reduces the operational voltage of the energy storage device.

With this energy storage device information, sub-program 706 can determine an estimated time to drain energy storage devices 416. This can be accomplished by calculating the capacity of the energy storage devices in joules divided by the powernet demand in watts to yield a time in seconds until the energy storage device is empty.

Sub-program 708 that compares the risk of lost regeneration of power versus the disruption that early start of an accessory will cause uses the estimated time to drain energy storage device 416 determined in sub-program 706 and the estimated time until the next regeneration event of sub-program 704 and other information used to determine the relative weight for each.

A cost function may be established using values for estimated reduction in regeneration capacity, for the cost per reduction in capacity, the estimated loss in useful energy and the cost of the loss of useful energy. The estimated reduction in regeneration capacity is the reduction due to remaining charge in energy storage device 416 in excess of SOC target 551 of FIG. 9. The cost per reduction in capacity is the cost associated with a reduction in fuel economy due to the inability to store all of the regenerative power. This cost is, in turn, also dependent on the probability that the incremental capacity will be required during the next regenerative event. The estimated loss in useful energy is the loss due to moving energy between energy storage devices, if multiple storage devices are included in the energy storage system. In such case, the loss is dependent on the level of efficiency of converting energy between the high power energy storage device receiving regenerative power and a high energy storage device.

The cost function is used to create a cost model in which each of the above cost function value is linked to the estimates of time to drain the energy storage device that receives the regenerative power, to the time of the next stop and the estimate of remaining capacity of the energy storage device at any given time.

The actual power setting for each device is determined by optimizing against the above described cost function, depending on actual values for capacity reduction, loss of useful energy and their respective relative costs. The operational program (algorithm) may be used to maximize the "goodness" of the solution against the preceding requirement and considerations.

Still referring to FIG. 11, based on the result from sub-program 708, at Step 713 of operational program 700, a determination is made as to whether the risk of losing regeneration power is higher than the cost of disruption. If the risk is too high, i.e. higher than a preselected level of risk, then at step 715, either ESS controller 402 or vehicle controller 404, sets the controlled accessory or accessories to continue operating in a normal mode of operation. Then at Step 719, operational program 700 proceeds to determine whether the energy storage device receiving the regenerative power, such as a relatively high power storage device, is at the target or desired SOC 551, shown in FIG. 9. If not, then operational program 700 returns to regeneration event program 702. If the energy storage device is at the desired state of charge SOC 551, then the energy storage device is recognized to be in condition to accept regenerative power, at Step 721. Then, at Step 723, if the vehicle is experiencing a regenerative event, energy storage device 416 accepts regeneration power, at Step 725. Otherwise, operational program 700 then returns to the regeneration event program 702.

If the determination at Step 713 is positive (i.e., not a high risk), then the accessories are controlled to accelerate the power drain of scheduled or periodic accessory components, at Step 717. Operational program 700 then proceeds back to determining whether the energy storage device receiving the regenerative power is at the target, or desired, SOC 551, at Step 719.

The power drain by scheduled or periodically operated accessory components is achieved by using expected excess amounts of energy in the energy storage device for other uses. A determination of which of the consumers 410 and 412 or others depend on several factors including efficiency, disruption to vehicle 10 or to the occupants. With respect to efficiency, a determination of how much of the energy used ahead of schedule will be lost compared to normal operation. The disruption must be estimated and quantified. For example, if the climate control system is used early, how much outside the expected or normal range of operation will be tolerated before being noticed? Consideration must also be given to whether the schedule of operation of certain components will negatively impact other components.

The actual power setting for each device will be determined by optimizing against the cost function determined as described above. This will depend on actual values for the capacity reduction, loss in useful energy, disruption, as described above and their relative costs. Also, an optimization method may be used to maximize the "goodness" of the solution against the requirement and considerations discussed above. The program is based on the optimized solution which is implemented by an appropriate one or more of the controllers.

Figure 12:
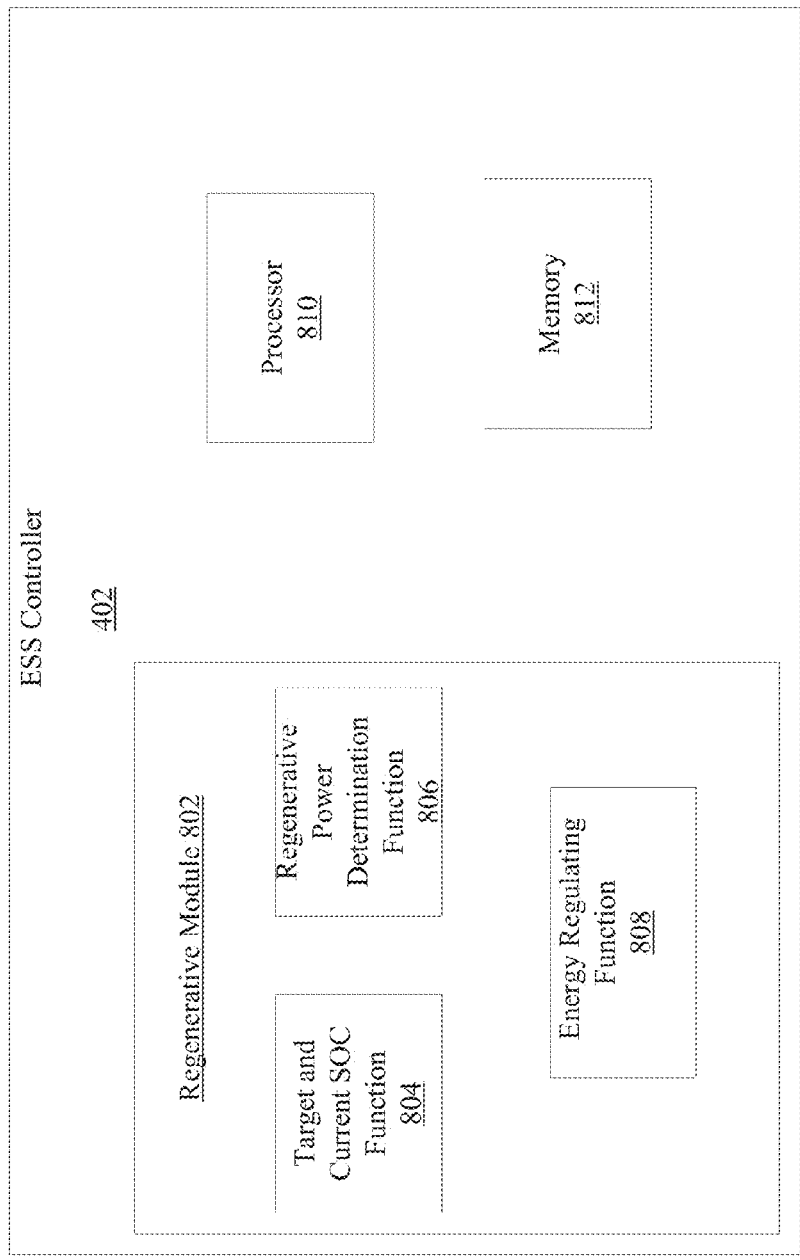
FIG. 12 is a block diagram illustrating components of an energy storage system controller.
Figure 13:
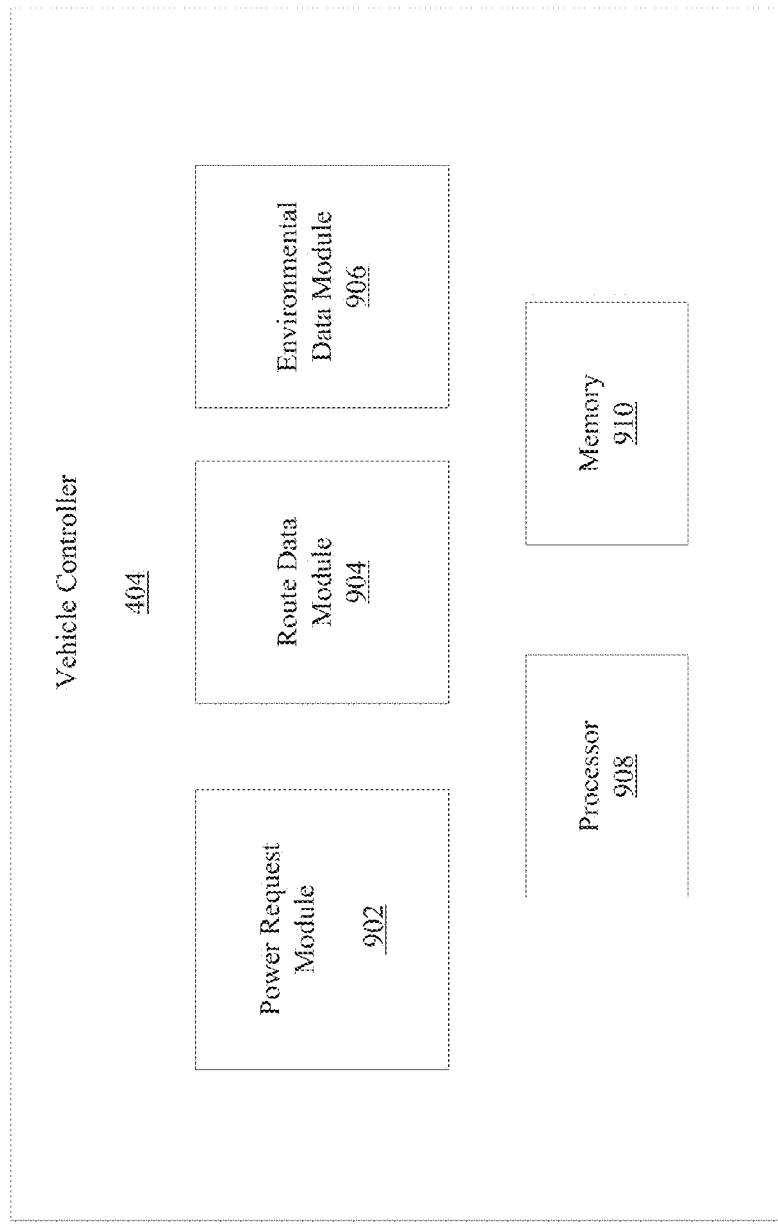
FIG. 13 is a block diagram illustrating components of a vehicle controller.

As shown in FIG. 12, ESS controller 402 includes a regenerative module 802, which in turn includes a target and current SOC function 804, a regenerative power determination function 806, an energy regulating function 808, a processing unit 810, and a memory unit 812 coupled to processing unit 810. Further, as shown in FIG. 13, vehicle controller 404 includes an accessory load module 902, a route data module 904, an environmental data module 906, a processing unit 908, and a memory unit 910 coupled to processing unit 908.

Each of processing units 810 and 908 can be implemented on a single-chip, multiple chips or multiple electrical components. For example, various architectures can be used including dedicated or embedded processor or microprocessor (µP), single purpose processor, controller or a microcontroller (µC), digital signal processor (DSP), or any combination thereof. In most cases, each of processing units 810 and 908 together with an operating system operates to execute computer code and produce and use data. Each of memory units 812 and 910 may be of any type of memory now known or later developed including but not limited to volatile memory (such as RAM), non-volatile memory (such as ROM, flash memory, etc.) or any combination thereof, which may store software that can be accessed and executed by processing units 810 and 908, respectively, for example.

Figure 14:
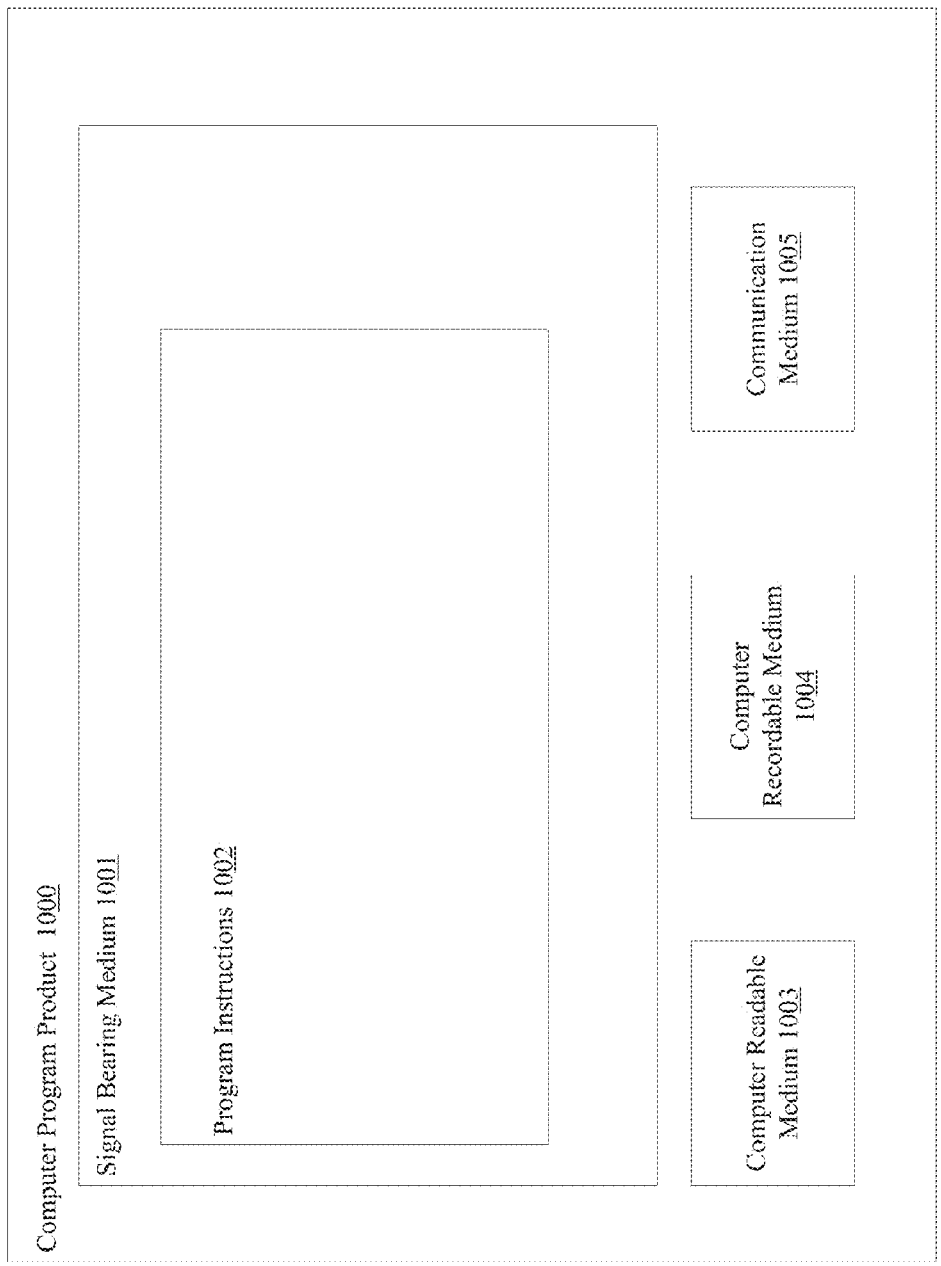
FIG. 14 is a schematic diagram illustrating a conceptual partial view of an example computer program product.

In some embodiments, the disclosed method may be implemented as computer program instructions encoded on a computer-readable storage media in a machine-readable format. FIG. 14 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by a processing unit may provide functionality or portions of the functionality described above with respect to FIGS. 1-11. Thus, for example, referring to the embodiment shown in FIG. 11, one or more features of blocks 702-725, may be undertaken by one or more instructions associated with the signal bearing medium 1001.

In some examples, signal bearing medium 1001 may encompass a non-transitory computer-readable medium 1003, such as, but not limited to, a hard disk drive, memory, etc. In some implementations, the signal bearing medium 1001 may encompass a computer recordable medium 1004, such as, but not limited to, memory, read/write (R/W) CDs, R/W DVDs, etc. In some implementations, signal bearing medium 1001 may encompass a communications medium 1005, such as, but not limited to, a digital and/or an analog communication medium (e.g., a fiber optic cable, a waveguide, a wired communications link, etc.).

While certain features and embodiments of the invention have been illustrated and described, many modifications and changes may occur to those skilled in the art without materially departing from the novel teaching and advantages of the subject matter recited in the appended claims. It therefore should be understood that the appended claims are intended to cover all such modification and changes as fall within the true spirit of the invention. Furthermore, in an effort to provide a concise description of the exemplary embodiments, all features of an actual implementation may not have been described which do not relate to the presently contemplated best mode of carrying out the invention or to enabling the claimed invention. It should be appreciated that in the development of any such actual implementation, as in any engineering or design project, numerous implementation specific decisions may be made. Such a development effort might be complex and time consuming, but would nevertheless be a routine undertaking of design, fabrication and manufacture for those of ordinary skill having the benefit of this disclosure, without undue experimentation.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The technical effects and technical problems in the specification are exemplary and are not limiting. It should be noted that the embodiments described in the specification may have other technical effects and can solve other technical problems.

What is claimed is:

1. A system, comprising:
a source of regenerative power that generates power during a regenerative event;
an electrical energy storage system connected with the source of regenerative power to receive and store regenerative power during the regenerative event;
an accessory load that reduces an amount of energy stored in the energy storage system when being powered;
a source of information; and
an accessory load controller responsive to the source of information to:
estimate when a next occurrence of a regeneration event will occur,
predict whether the energy storage device will be in a state of charge condition to receive regenerative power at the time of the predicted regeneration event,
estimate a time needed to drain power from the energy storage device,
compare a risk of losing regenerative power based on when the next occurrence of the predicted regenerative event will occur and the time needed to drain the energy storage device to enable optimum benefit from the predicted regenerative event, and
control an application of electrical power to the accessory load based on the prediction in order to reduce the amount of energy stored in the energy storage device and minimize any loss of regenerative power during the predicted regenerative event.

2. The system of claim 1, wherein the accessory load is from a vehicle and the predicted regenerative event is based in part upon at least one of:
a prior history of accessory load usage,
prior history of accessory load usage over multiple time scales,
a history of accessory load usage over a time period of between prior seconds and a prior hour during a current trip of the vehicle,
a stored history of accessory load usage during trips prior to a current trip,
a current state of the vehicle during the current trip including at least one of vehicular speed and acceleration, and
route information of the current trip.

3. The system of claim 1, wherein the accessory load is from a vehicle and the predicted regenerative event is based at least in part on at least one of:
a statistical model,
detected type of driving style including speed and acceleration,
stored driving data from prior trips of the vehicle,
stored energy storage device data,
explicit route information from a vehicle navigation system, and
route information from a GPS unit.

4. The system of claim 1, wherein the accessory load controller is responsive to a state of charge decreasing below a preselected minimum to delay application of power to the accessory load until the amount of energy stored has been increased at least above the preselected minimum.

5. The system of claim 1, wherein the accessory load is from a vehicle and can be at least one of:
an optional accessory that is nonessential for operation of the vehicle,
an accessory that normally draws power intermittently,
an accessory that draws power based on a time schedule,
an air conditioner, and
an electrical heating unit.

6. The system of claim 1, wherein the accessory load controller accelerates power drain of the electrical energy storage system if a risk of losing regenerative power is greater than a level of disruption to normal operation of the accessory load.

7. The system of claim 1, wherein the source of regenerative power is connected with a drive train of a vehicle and the information is vehicle information.

8. A computer-implemented method of reducing loss of regenerative power provided by a regenerative power source by controlling power usage of an accessory load, comprising:
predicting when a next regenerative event during a current trip will occur;
predicting when an electrical energy storage device connected with the regenerative power source will be in a condition to receive regenerative power;
estimating a time needed to reduce energy from the electrical energy storage device to a preselected level for receipt of regenerative power;
comparing a risk of losing regenerative power based on when the next regenerative event will occur and the estimated time needed to reduce the electrical energy storage device to benefit from the next regenerative event; and
controlling an application of electrical power to the accessory load to reduce loss of regenerative power due to the electrical energy storage device having a greater amount of energy to accept regenerative power during the next regenerative event.

9. The computer-implemented method of claim 8, wherein the regenerative power is in a vehicle and predicting the condition is based upon at least one of:
prior history of accessory usage,
prior history of accessory usage over multiple time scales,
a history of accessory usage over a time period of between prior seconds and a prior hour during a current trip of the vehicle,
a stored history of accessory usage during trips prior to a current trip
a current state of the vehicle during the current trip including at least one of vehicular speed and acceleration, and
route information of the current trip.

10. The computer-implemented method of claim 8, wherein the regenerative power is in a vehicle and prediction of the next regenerative event is based at least in part on at least one of:
a statistical model,
type of driving style including speed and acceleration,
stored driving data from prior trips of the vehicle,
stored energy storage device data,
explicit route information from a vehicle navigation system, and
route information from a GPS unit.

11. The computer-implemented method of claim 8, wherein controlling the application of electrical power comprises:
terminating the application of electrical power to the accessory load when an amount of energy stored in the electrical energy device decreases beneath a preselected minimum level.

12. The computer implemented method of claim 11, wherein the preselected minimum level is a first preselected minimum level, and wherein controlling the application of electrical power comprises resuming the application of electrical power to the accessory load when the amount of energy stored in the electrical energy storage device increases above a second preselected level after power has been automatically reduced.

13. The computer implemented method of claim 8, wherein controlling the application of electrical power comprises:
   determining an amount of energy stored of the electrical energy storage device, and
   responding to the amount of energy stored in the electrical energy storage device when above a preselected level by applying power to the accessory earlier than it would be applied during normal operation to reduce the amount of energy stored in the energy storage device, thereby enhancing acceptance of charge by the energy storage device during the next regenerative event.

14. The computer-implemented method of claim 8, wherein controlling the application of electrical power comprises:
   determining a relative likelihood of the amount of energy stored in the electrical energy storage device being above a preselected level to receive regenerative power when the next occurrence of a regenerative event is predicted such that there will be a risk of losing regenerative power; and
   applying power to the accessory load to reduce the amount of energy stored beneath the preselected level before the next predicted occurrence of the regenerative event.

15. The computer-implemented method of claim 8, wherein controlling the application of electrical power comprises:
   accelerating power drain of the electrical energy storage device only if the risk of losing regenerative power is greater than a preselected level of disruption to normal operation of the accessory.

16. The computer-implemented method of claim 15, wherein the accessory load controller sets the accessory load to normal operation if the risk of losing regenerative power is less than a preselected maximum level of disruption to normal operation of the accessory.

17. The computer-implemented method of claim 8, wherein the regenerative power is in a vehicle and controlling the application of electrical power comprises comparing a risk of lost regenerative power with inefficiency that may result from early application of power to the accessory load, based on at least one of:
   estimated reduction in regenerative capacity,
   cost associated with a reduction in fuel economy, and
   estimated cost of loss of useful energy.

18. A computing system, comprising:
   a processing unit and a memory unit storing instructions that are operable, when executed by the processing unit, to cause the processing unit to perform a method for reducing loss of power from a regenerative source of power that is provided only intermittently during regenerative events to an energy storage device connected with both the source of regenerative power source and an accessory load due to the energy storage device having more than an optimal level of charge, the method comprising:
   predicting when a next regenerative event will occur;
   determining whether the energy storage device will be at a sufficiently low charge level to be able to accept and store a desirable amount of the regenerative power during the next regenerative event;
   estimating a time needed to reduce energy from the electrical energy storage device to a preselected level for receipt of regenerative power;
   comparing a risk of losing regenerative power based on when the next regenerative event will occur and the estimated time needed to reduce the electrical energy storage device to benefit from the next regenerative event; and
   applying power to the accessory load to reduce a charge level of the energy storage device, if it is determined that the energy storage device will not be at the sufficiently low charge level at the time of the next regenerative event unless power is prematurely applied to the accessory.

19. The computing system of claim 18, wherein the computing system refrains from applying power to the accessory load if it is determined that the energy storage device will be at the sufficiently low charge level at the time of the next regenerative event.

20. The computing system of claim 18, wherein the computing system terminates the application of power to the accessory load after the occurrence of the next regenerative event or after the charge of the energy storage device has been reduced to the sufficiently low charge level.

21. The computing system of claim 18, wherein the computing system compares a cost of lost regenerative power against a cost of disruption to the system to determine if power should be prematurely applied to the accessory.

22. The computing system of claim 18, wherein determining whether the energy storage device will be at a sufficiently low charge level is based on at least one of:
   a prior history of accessory usage,
   prior history of accessory usage over multiple time scales,
   a history of accessory usage over a time period of between prior seconds and a prior hour during a current trip of the vehicle,
   a stored history of accessory usage during trips prior to a current trip,
   a current state of the vehicle during the current trip including at least one of vehicular speed and acceleration, and
   route information of the current trip.

23. The computing system of claim 18, wherein predicting when the next regenerative event will occur is based at least in part on at least one of:
   a statistical model;
   type of driving style including speed and acceleration of a driver of a vehicle;
   stored driving data from prior trips of the vehicle;
   stored data;
   explicit route information from a vehicle navigation system; and
   route information from a GPS unit.

24. The computer system of claim 18, further comprising:
   comparing a risk of lost regenerative power with inefficiency that may result from early application of power to the accessory load, wherein the comparison is based on at least one of estimated reduction in regenerative capacity, cost associated with a reduction in fuel economy, and estimated cost of loss of useful energy.

* * * * *